June 24, 1930.  W. SCHMID  1,768,376
UNRAVELING MACHINE FOR HORSEHAIR, GRASS WRACK, AND THE LIKE
Filed Jan. 10, 1929  2 Sheets-Sheet 1
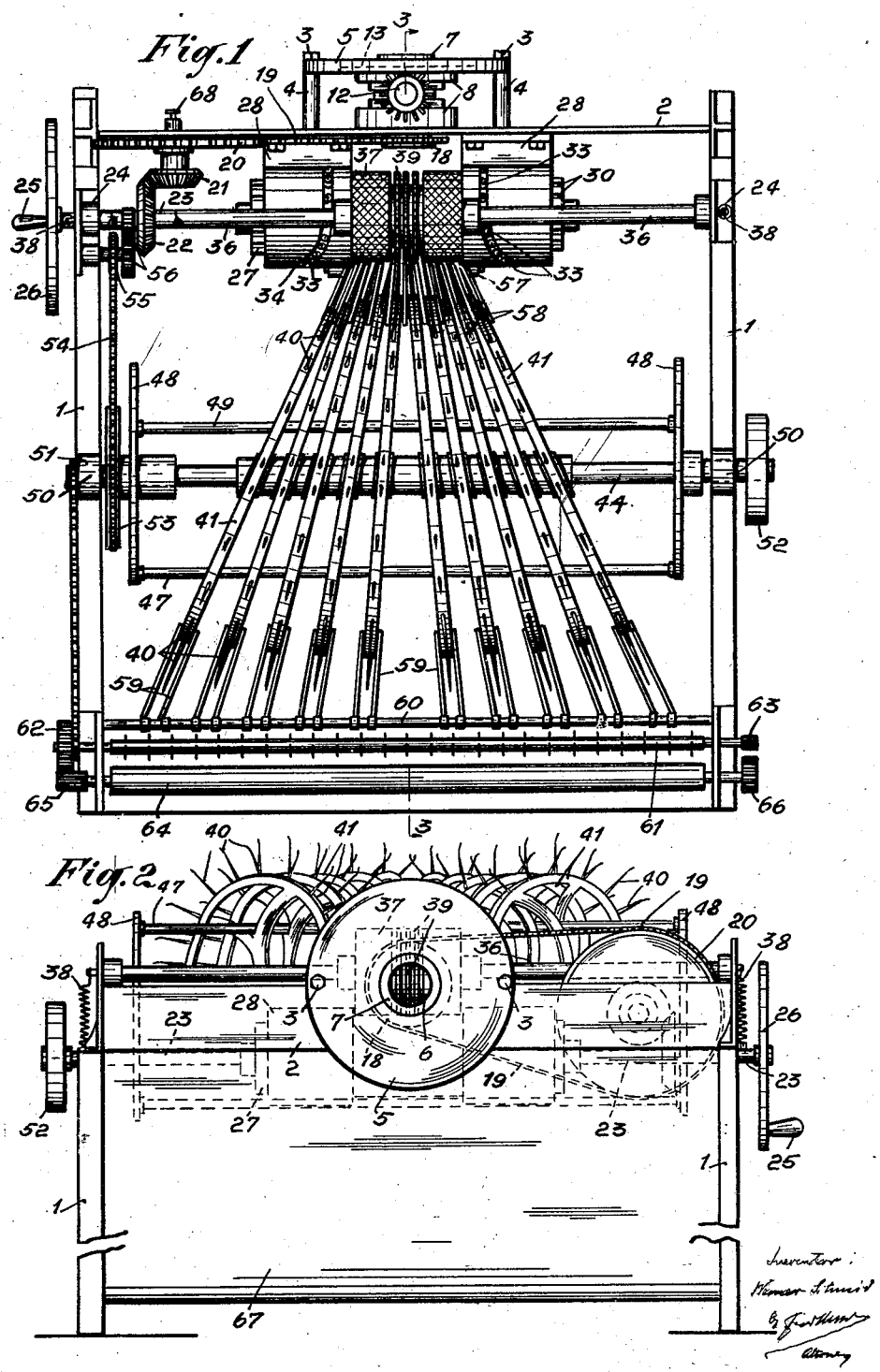

June 24, 1930.  W. SCHMID  1,768,376
UNRAVELING MACHINE FOR HORSEHAIR, GRASS WRACK, AND THE LIKE
Filed Jan. 10, 1929  2 Sheets-Sheet 2
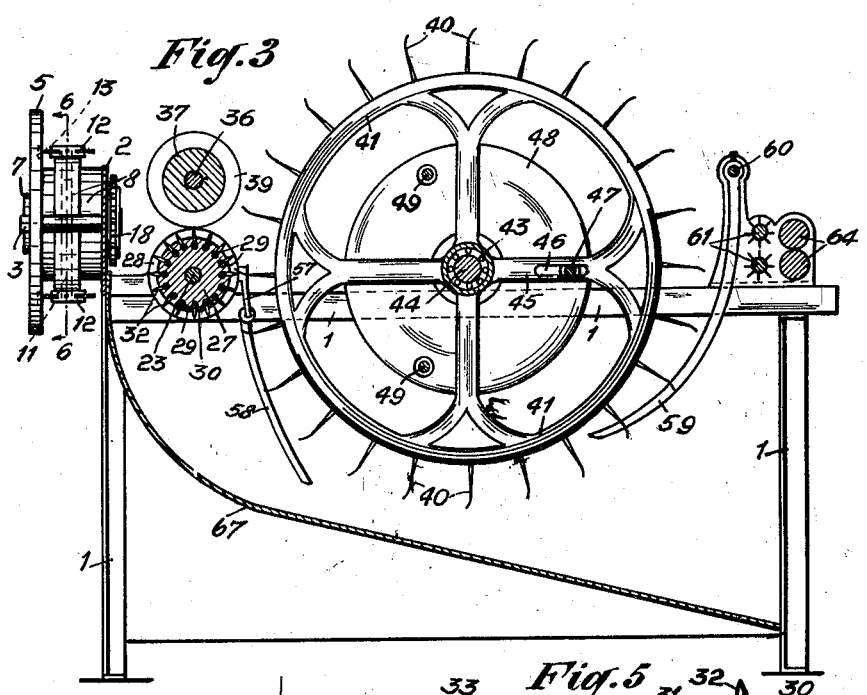
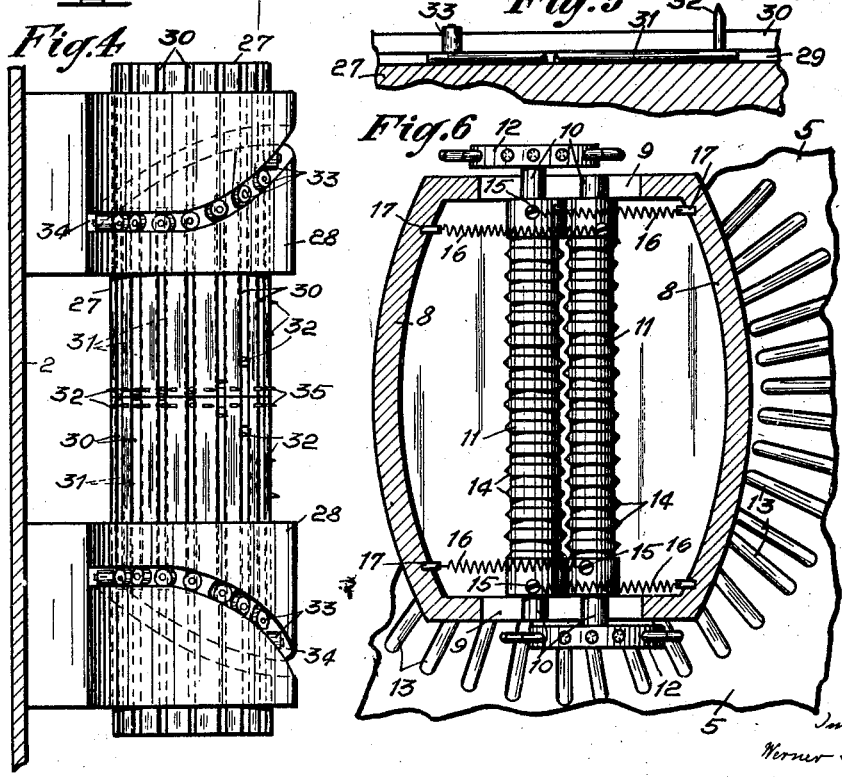

Patented June 24, 1930

1,768,376

UNITED STATES PATENT OFFICE

WERNER SCHMID, OF RUMLANG, SWITZERLAND

UNRAVELING MACHINE FOR HORSEHAIR GRASS WRACK AND THE LIKE

Application filed January 10, 1929, Serial No. 331,560, and in Switzerland February 10, 1928.

The unraveling of horse-hair, grass wrack, and the like by means of unraveling machines presents still serious difficulties notwithstanding the different systems. The material is either damaged by violent treatment, or the function of the machine is exposed to frequent disturbances, owing to the peculiar properties of horse-hair, grass wrack and the like. This is specially perceivable for unskilled workmen, so that unraveling machines are used as little as possible.

Reel and seasaw unraveling machines present the inconvenience, that the reels or rocking elements fitted with points or hooks have a very prejudicial effect on the material, as the latter is not softly loosened but literally violently torn, whereby the several strands of the material, for example horse-hair, lose more or less their elastic property.

The expensive horse-hair is consequently transformed into a material of inferior value owing to the treatment on these unraveling machines.

It has been proposed to use unraveling machines which treat the material very carefully by loosening the same in a manner similar to the unraveling by hand. Machines of this type possess very little efficiency so that it is not profitable to use the same.

This invention has for its object to improve the construction of the machine for unraveling horse-hair, grass wrack and the like so that the inconveniences connected with the commonly used machines are absolutely obviated.

An embodiment of the invention is illustrated by way of example, in the accompanying drawings in which:—

Fig. 1 is a top plan view of an unraveling machine according to the invention.

Fig. 2 is a front elevation.

Fig. 3 is a longitudinal section on line 3–3 of Fig. 1.

Fig. 4 shows in top plan view on larger scale a plucking drum.

Fig. 5 shows in side elevation the guide rod for the drum shown in Fig. 4.

Fig. 6 is a section on line 6–6 of Fig. 3.

The machine consists of a frame 1 on the front side of which a plate 2 is mounted. On this plate a feeding disc 5 is fixed by means of screws 3 and bolts 4. The feeding disc 5 has a central hole 6 through which the material to be unraveled is fed. Behind the disc 5 a casing 8 is loosely mounted on a bearing sleeve 7.

This casing 8 (Fig. 6) has slots 9 in its two end plates, in which the journals 10 of untwisting cylinders 11 are guided. On the extended journal 10 of each cylinder at opposite sides of the casing a pinion 12 is mounted the teeth of which are designed to mesh with teeth 13 in the edge of the central hole of the feed disc 5. If the casing 8 with the cylinders 11 and with the pinions 12 rotates, the two pinions and through the same the cylinders 11 are uniformly rotated around their axes, owing to the engagement with the teeth 13 of the feed disc 5, so that the strand of horse hair or grass wrack is untwisted and at the same time conveyed. The untwisting cylinders 11 have ribs 14, those on the one cylinder standing opposite the grooves in the other cylinder. Close to the two ends of the untwisting cylinders 11 a spiral spring 16 is fixed by means of screws 15, the other ends of said springs being hooked into studs 17 projecting from the casing 8. The spiral springs 16 press the untwisting cylinders 11 against each other so that the journals 10 are approximately at the middle of the slots 9. The material to be unraveled introduced between the untwisting cylinders 11 is elastically clamped between the same by the action of the springs 16 as is necessary for the untwisting. The resilient arrangement of the cylinders 11 facilitates passing through of thicker portions of the material so that by the irregular thickness of the strand no disturbances of the function are caused.

On the lower end of the bearing sleeve a sprocket wheel 18 is keyed which is connected by a chain 19 to a transmission gear wheel 20. This gear wheel 20 is rigid with a bevel wheel 21 with which meshes with a bevel wheel 22, which is fixed on a shaft 23 journaled in bearings 24 of the machine frame 1. On one end of this shaft 23 a driving wheel 26 with a handle 25 is fixed.

On the shaft 23 a plucking drum 27 is mounted which registers with the charging elements 5, 8, 12 and is guided between two arms 28 fixed on the plate 2. This drum has near its circumference several concentric bores 29 spaced from each other into which end longitudinal grooves 30 starting from the circumference. In the bores 29 guide rods 31 are arranged adapted to carry out a reciprocating movement and carrying at one end a pointed pin 32 and at the other end a roller 33. The pointed pins 32 extend through the longitudinal grooves 30 and project from the circumference of drum 27. The guide rollers 33 engage with curved grooves 34 in the arms 28, said curved grooves extending, viewed in top plan view, from the middle to the rear the one towards the other so that two adjacent pins 32 when moving in rearward direction are spaced a greater distance. Between the longitudinal grooves 30 stationary pins 35 are arranged at the middle of drum 27, said drum being preferably composed of two elements joining at the middle. Above the drum 27 a pressure roll 37 mounted on a rod 36 is arranged shiftable in vertical direction and controlled at both ends by springs 38 in such a manner that the rod 36 and with the same the roll 37 has the tendency to move downward towards the drum 27. The pressure roll 37 has at its centre ring-shaped grooves 39.

When the untwisted horse-hair strand gets between the drum 27 and the pressure roll 37, it is gripped by the pins 32, 35 advanced and unraveled by the pointed pins 32 moving away from each other in lateral directions. The drum 27 and the pins 32, 35 rotate and the elastic pressure of roll 37 ensures a secure conveying and unraveling of the material inserted between the same.

Behind the plucking drum 27 the main unraveling elements are arranged, which consist of several wheels 41 having pointed pins 40 on their circumference. The wheels 41 are mutually inclined and their narrower position faces the plucking drum 27. The wheels 41 are mounted, by means of ball bearings 43, loosely on a shaft 44. Each spoke 45 of said wheels 41 has a longitudinal slot 46 through which a driving rod 47 extends. This driving rod connects two discs 48 which are further connected by two other rods 49. The discs 48 are mounted on the journals 50 of shaft 44 journaled in bearings 51. On the one journal a belt pulley 52 is keyed designed to receive the driving belt of a driving engine not shown. On the other journal of shaft 44 a spur wheel 53 is keyed which is connected by a chain 54 with an intermediate gear wheel 55 which in its turn is driven from shaft 23 by means of a gear wheel 56. When the elements 50, 53 rotate, the discs 48 and with the same the wheels 41 are rotated. The material preliminarily unraveled by the drum 27 is then gripped by the pointed pins 40, conveyed to the rear, and unraveled for the second time, owing to said wheels 41.

In order to prevent dropping off of the material, when delivered by the plucking drum 27 to the wheels 41 or points 40, a bracket 57 is fixed on the arms 28, and downwardly directed forks 58 curved in rearward direction are fixed on said bracket. These forks 58 engage one between the pointed pins of two adjacent unraveling wheels.

The material is unraveled by the wheels 41 which come to lie on the outer ends of pins 40 of these wheels. The wheels turn in anticlockwise direction, Fig. 3. Forks 59 fixed on a traverse rod 60 engage between every two adjacent wheels so that they lie between the pins. By the turning of the wheels 41 the material must pass between forks 59 and is stripped off or removed by the prongs.

As the material is a very loose mass it is lifted against the reels 61 formed by wooden rolls with pointed pins certain portions of the material still engaging the pins 40 thus preventing the material from falling. It should be mentioned that the forks 59 owing to their curved shape only gradually pull the material off the pins 41, as can easily be seen from Fig. 3. If suddenly removed, e. g. at the lower end thereof, the material can however fall.

The tooth wheel 62 drives the reel 61 as also the pinion 65 and thereby the roll 64. As shown in Fig. 3 each two opposite reels 61 and rolls 64 are provided. The pinion 63 drives the corresponding lower reel and the pinion 66 the corresponding lower roll 64. The intermediate wheel 62 shown on the left of Fig. 1 therefore only drives the upper reel 61. This also applies to the pinion 65 which only drives the upper roll 64.

The revolving speed of the draw rolls 64 is considerably higher than that of the reels 61, so that the material is further stretched in longitudinal direction on the path from the reels to the draw rolls to be delivered ready for use. The draw rolls 64 prevent further any eventual entangling of the material in the reels. Below the plucking drum 27 and the unraveling wheels 41 a downwardly inclined sheet metal plate 67 is arranged fixed on the frame and designed to collect waste material. 68 is a clutch pin adapted to be engaged and disengaged, so that the spur wheel can be engaged or disengaged with the pinion 21 to stop or start the spur wheel 18 and through the same the untwisting cylinders 11.

The operation of the unraveling machine described is briefly as follows: The strand of horse-hair or grass wrack to be unraveled is inserted into the central hole 6, and fed to the untwisting cylinders 11 after the machine has been started. The untwisting cylinders 11 grip and clamp then the material and untwist the strand owing to their circulating rotation. The cylinders 11 rotate at the same time around their own axis, owing to the gearing of the pinion 12 with the teeth 13 of the stationary disc 5 and ensure thus the conveying of the material. The untwisted strand of material is fed to the plucking drum 27 and gripped by the pins 32 and 35, the pins 32 moving away from each other in rearward direction so that the material is stretched. In this state the material is fed to the wheels 41 and gripped and drawn along by the pointed pins 40. Owing to the radiating arrangement of the wheels 41, the material is stretched again, stripped off by the stripping forks 59 as soon as it gets into the range of these forks. The material is finally conveyed to the reels 61 and gripped and conveyed by the same towards the draw rolls 62. The latter possess a considerably higher revolving speed than the reels 61, so that the unraveled material is again somewhat pulled between the same. If material should entangle in the reels 61 or in the stripping forks 59, it will easily be pulled away by the pull exerted by the draw rolls. By the draw rolls 64 the material ready for use is delivered into a collector.

Claims:

1. An unraveling machine specially for horse hair, grass wrack and the like, comprising in combination with the frame, a feeding disc having a central hole with toothed edge, two untwisting cylinders adapted to circulate and to rotate around their axes receiving the strand of material from said charging disc, a plucking drum, pins in said plucking drum positively driven so that they are displaced in axial direction to unravel the untwisted material, wheels mutually inclined towards said plucking drum, pointed pins projecting from said wheels, stripping forks behind said wheels, a set of reels behind said stripping forks and draw rolls behind said reels rotating at a higher speed than said reels.

2. An unraveling machine as specified in claim 1, comprising in combination with the machine frame and the charging disc having a central hole with toothed edge, a casing having a slot in each end plate, the untwisting cylinders having ribs engaging with the grooves between the ribs of the opposite cylinders, springs for elastically pulling said untwisting cylinder against each other, journals of said untwisting cylinders guided in said slots of said casing, and a pinion on one end of the axle of each untwisting cylinder, said pinions meshing with said teeth in the central hole of the charging disc.

3. An unraveling machine as specified in claim 1, comprising in combination with the machine frame, two arms projecting from said frame and having curved grooves, a plucking drum journaled in said arms and having several concentric axial bores and longitudinal grooves ending in said bores, a rod in each axial bore, a pin on one end of each rod projecting from the circumference of said drum, a guide roller on the other end of said rod engaging with said curved grooves of said arms so that at the rotation of said drum said rods and also said pins are positively moved by said guide rollers sliding in said curved guide grooves the material being partly unraveled by said pins, and a spring-controlled pressure roll loosely mounted above said plucking drum for pressing the material towards said drum and said pins respectively.

4. An unraveling machine as specified in claim 1, comprising in combination with the machine frame, the plucking drum and the main movable wheels, arms inwardly projecting from said machine frame in which said plucking drum is journaled, a bracket fixed on said arms, curved forks fixed on said bracket each fork engaging between the pointed pins of two adjacent unraveling wheels to prevent dropping off of the material at the transition from said plucking drum to said main unraveling wheels.

5. An unraveling machine as specified in claim 1, comprising in combination with the main unraveling wheels having each in one of the spokes a longitudinal slot, an axle on which said mutually inclined main unraveling wheels are loosely mounted, a rod extending through said spoke slots of said wheels, and two driving discs one on each end of said rod.

6. An unraveling machine as specified in claim 1, comprising in combination with the shiftable pins of the plucking drum, stationary pointed pins on the circumference of said plucking drum between said axially shiftable pins.

In testimony whereof I affix my signature.

WERNER SCHMID.